Feb. 14, 1961
J. PLUM
2,971,487
HIGH SPEED TOW TARGET
Filed Nov. 12, 1952
5 Sheets-Sheet 1
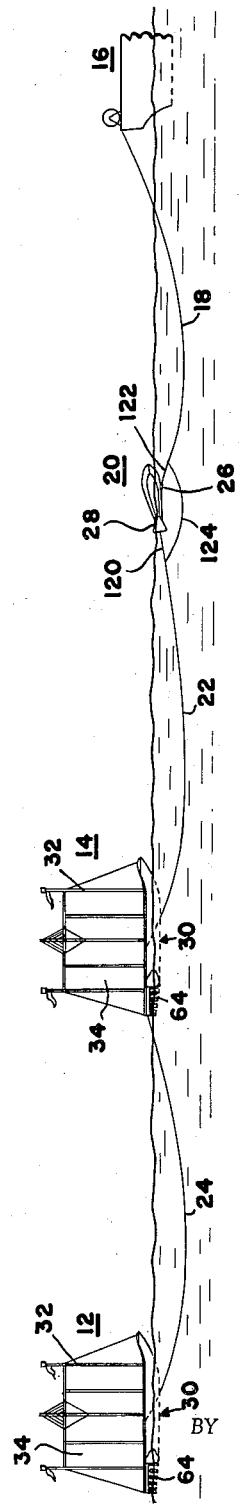
FIG. I
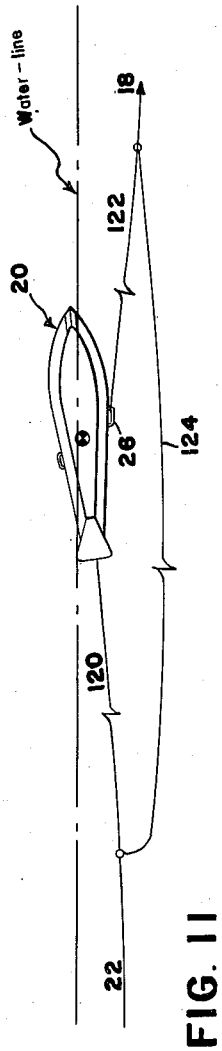
FIG. II
INVENTOR
JOHN PLUM
BY George Sipkin
B. L. Tangerell
ATTORNEYS Feb. 14, 1961 J. PLUM 2,971,487
HIGH SPEED TOW TARGET
Filed Nov. 12, 1952 5 Sheets-Sheet 2

INVENTOR
JOHN PLUM

Feb. 14, 1961  J. PLUM  2,971,487
HIGH SPEED TOW TARGET

Filed Nov. 12, 1952  5 Sheets-Sheet 3

INVENTOR
JOHN PLUM

BY George Sipkin
B. L. Zangwill
ATTORNEYS

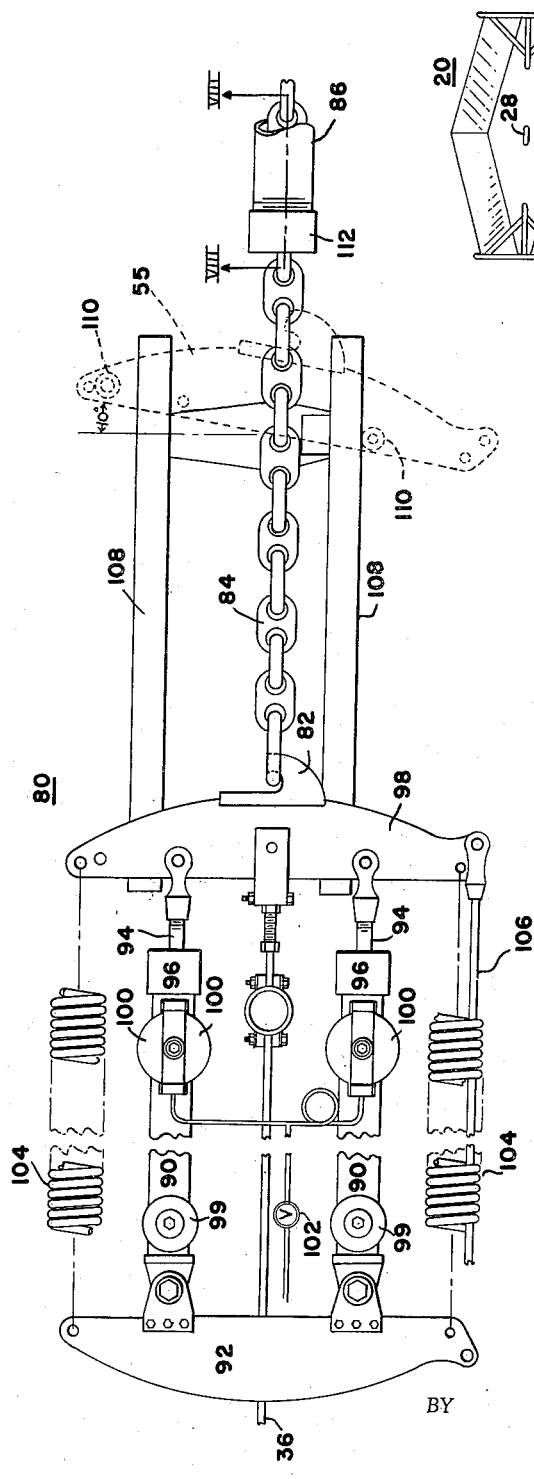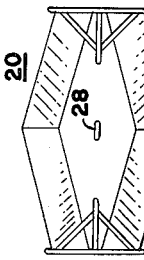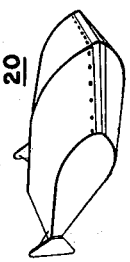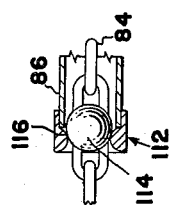

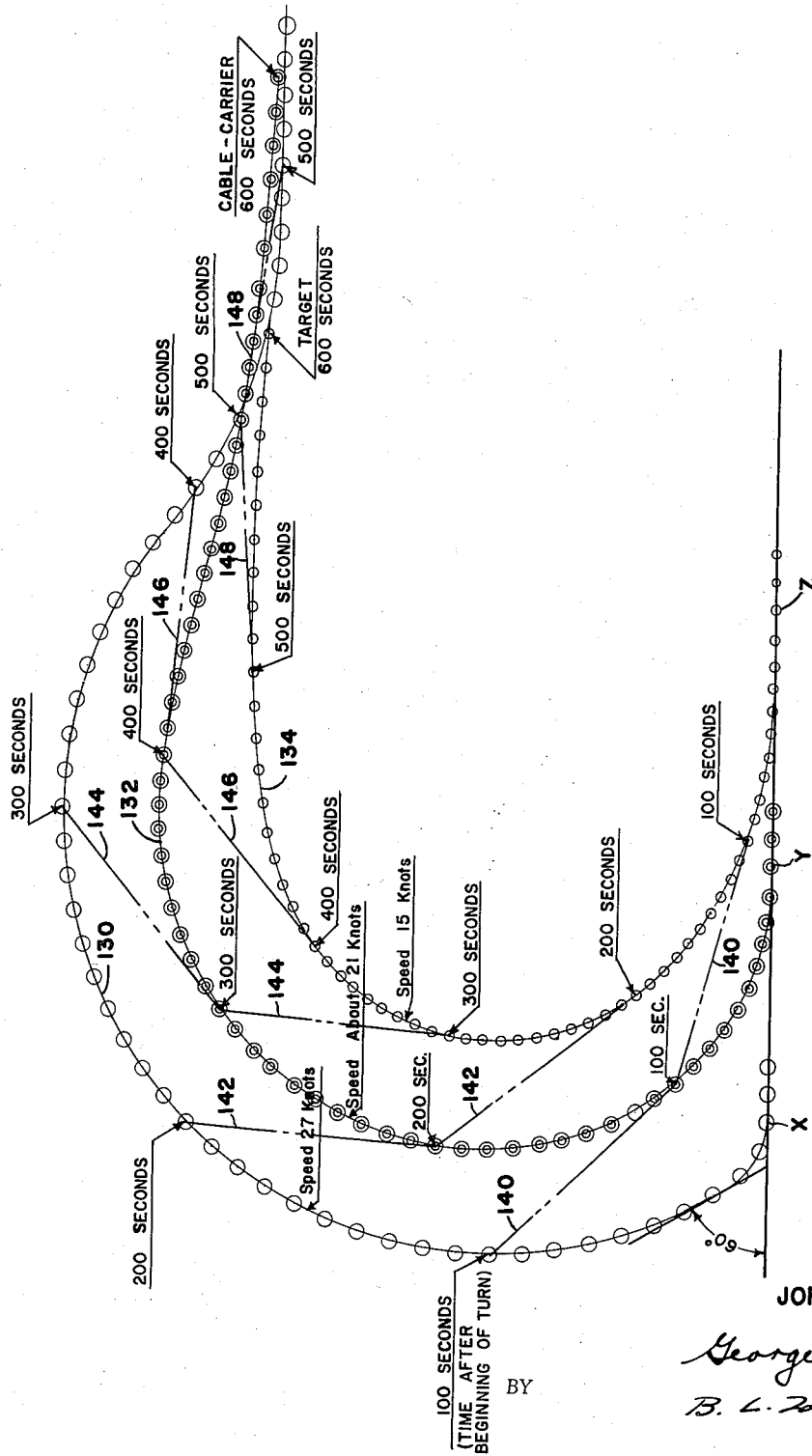

United States Patent Office 2,971,487
Patented Feb. 14, 1961

2,971,487

HIGH SPEED TOW TARGET

John Plum, 1611 Connecticut Ave. NW., Washington, D.C.

Filed Nov. 12, 1952, Ser. No. 320,162

20 Claims. (Cl. 114—66.5)

(Granted under Title 35, U.S. Code (1952), sec. 266)

The invention described herein may be manfactured and used by or for the Government of the United States of America for governmental purposes without the payment of any royalties thereon or therefor.

The present invention relates to equipment of a type that is towed through water by vessels, and especially to towed target for gun-firing practice; and more particularly relates to improvements in towed targets and tow cables therefor.

Towed targets must be buoyant, and should be capable of remaining afloat in spite of numerous hits by shell fire, including hits rupturing the bottom planking of the target in numerous places. Additionally, towed targets must be towed at a great distance from the towing vessel to provide adequate protection for the towing vessel from the shell fire. A gradual increase in the size of targets, the demand for higher towing speed, and for greater distance between the target and the towing vessel have resulted in greatly increased load on the target from the downward component of the pull in the towline. Because of these and other considerations, towed targets have usually been built as floating masses of solid wooden structures of considerable weight. For example, a standard target of the prior art has an initial weight of 150,000 pounds before it is water logged, and is towed with about seven thousand feet in length of one inch diameter cable. As a consequence, the maximum speed of such targets is only about 18 knots since the tension in towing cable reaches the limit of its yield strength, such speed being much below that of modern high-speed ships. In order to increase the speed, for example, to 30 knots, a one and three-eighths inch diameter cable would be the smallest of the commercial cables that could be used with out exceeding its yield strength.

A further disadvantage of present towing equipment resides in the fact that a long, heavy tow cable will sag in a curve somewhat like a catenary which is most upright at the points of attachment of the cable to the hull of the target. A large portion of the weight of the tow cable must be carried by the target, and the vertical component of the tension of the cable that pulls on the target is very large, resulting in a large target drag that produces a very strong downward pull on the target. This downward pull of the tow cable may depress the bow of the target to such an extent that all maneuverability is lost, and the target may yaw, nose dive or do a combination of both. For example, at 30 knots and with 7,000 feet of the one and three-eighths inch cable, the downward component of the pull from the towline, which is termed the cable load, would be in the order of 33,000 pounds. Experience has shown that a cable load of approximately 10,000 pounds is about the maximum load the present 150,000 pound solid wood target can safely carry at its tow point without nose diving or capsizing; consequently, it is either necessary to enlarge the size of the target or to improve its design and the method of towing it.

Since target practice usually is costly, especially when a large group of vessels must go long distances to a suitable area in the ocean, it is also important that such target practice should be conducted without interruption, since any delay causes thousands of men to stand idle. Delays can be reduced by providing targets that maneuver readily, and also by connecting two or more targets in tandem, the last target being used first, although single targets are also towed initially at times.

Accordingly, it is a broad object of the invention to provide target and towing equipment that permits target practice to be conducted more rapidly and economically than before.

It is also an object of the invention to provide a towed target that is much lighter in weight than present targets for the same area of target screen.

A further object of the invention is to provide a lightweight towed target capable of being towed at high and low speeds, and with lateral stability.

Still another object of the invention is to provide a towed target that will remain stable and be towed safely at high and low speeds although ruptured repeatedly by gun-fire.

Another object of the invention is to provide a towed target which has inherent stability and high maneuverability.

A further object of the invention is to provide a vessel, especially a target, which has a low drag at the designed maximum speed, and a comparatively high drag at lower speeds.

Another object of the invention is to provide an improved cable means for towing at a great distance, and especially for reducing the sag and size, and hence the drag of the towing cable.

A primary object of the invention is to provide a lightweight towed target and co-operating lightweight towing cable therefor that provide improved maneuverability of the target at high and low speeds.

In achieving the foregoing and other objects, the invention incorporates many novel and co-operative features and innovations that depart from prior art methods and structures in several important respects. An important feature resides in reducing the sag and size, and hence the drag, of the towing cable and thereby reduce the cable load on the target. This is accomplished by the addition of floats or cable-carriers which, in effect, help to support the cable at an intermediate point or points along its length, and by grading the thickness of the cable so that it is thickest or strongest where it is subjected to the most tension, and is smaller or thinner farther from the towing vessels where the tensions in it are less. Preferably the cable consists of several cable portions or towlines of decreasing diameter; but the invention contemplates a minimum number of floats, as little as a single float being satisfactory.

The introduction of the floats or cable-carriers and several sizes of cable or tapered cable have a cumulative effect on the reduction of cable tensions, cable sizes, cable weights, and cable loads. The cable-carrier will greatly reduce the sag of the towing hawser between the target and the towing vessel, so that the towing hawser will travel more parallel to the flow of the water. Since the drag of a cable perpendicular to the flow is about fifty times its drag when it is parallel to the flow, the use of the cable-carrier will reduce the drag of the towing hawser, and thereby the maximum cable tension in the towing hawser, which reduction in its turn permits the use of a smaller size towing cable which, of course, will have a smaller drag. The ultimate reduction of the cable load on the towed target permits the use of a target-hull which is primarily designed for carrying only the necessary target screen load, instead of a large hull which has to be designed to carry an enormous cable load at its tow point. In furtherance of the invention, a light planing hull is used and advantage is taken of its planing characteristics to further reduce the size of the cable because the tension in such a cable is approximately equal to the sum of the drags of the target and the cable itself, and a planing hull produces a relatively low drag at maximum speeds and hence does not require a large size of tow cable.

However, the drag of a cable towing a planing hull decreases rapidly with decrease of speed, and a towing cable which is strong enough for the high maximum speed of the planing hull would be unnecessarily strong and heavy at the slower speeds, and would produce a very large cable sag in the form of a large catenary curve. A large cable drag results in a dangerously large vertical pull on the target. The disadvantages can be overcome by reducing the sag by providing an exceptionally high target resistance or drag at slow speeds, and in accordance with an aspect of the invention, the towed planing hull is provided with a sea anchor in the form of a drag brake arranged in such a manner that it will produce a high drag at low speeds but not at high speeds. The arrangement is such that the drag of the sea anchor is effective at slow speeds on the stern where it facilitates the maneuverability of the target at such slow speeds, and tends to maintain the bow pointed in the direction of the towline and to keep the towline taut.

In accordance with other aspects of the invention, the sea anchor co-operates to produce further advantages. In the preferred embodiment of the invention, the target is towed by a towline which is joined to a chain running through a pipe to the top of a centerline girder of the target and is connected to a special securing means comprising an open hook and hydraulic shock absorbing and emergency release mechanism that helps to keep the cable taut or in the event of forces in excess of that which can be safely handled, releases the cable.

The sea anchor and shock absorbing mechanism also eliminate the damage that might otherwise occur during certain maneuvers or in a following sea when the cable load is increased momentarily to such magnitudes that a planing target steered through a conventional stabilizing bridle used in the prior art for securing directional stability is thrown into a violent yaw and overturned. The novel shock absorbing mechanism and sea anchor make a stabilizing bridle unnecessary by keeping the towline taut at slow speeds where most of the maneuvers occur and thereby improving the maneuverability at slow speed.

In accordance with further features of the invention, the planing target is made with a hollow hull to which several expendable watertight boxes are secured for further supporting and stabilizing the target at slow speeds. The arrangement of a lightweight planing target and watertight boxes has the further advantage that the hull can be left entirely open with the exception of small deck areas forward and aft. The water can flow freely through the transom and throughout the hull beneath the frames. When the hull moves forward, this arrangement functions as an enormous self-bailer, which empties the hull at about 12 knots. Any water entering the hull above this speed, either as spray, or through ruptures made by gun-fire, will be emptied as quickly as it comes in. Consequently, the towed target will have adequate stability at all speeds, whether or not its bottom has been ruptured repeatedly by gun-fire. Lateral stability and buoyancy are secured at a standstill and at slow speeds by the water-tight boxes clamped down between the frames.

The exact nature of this invention as well as other features, innovations, and advantages thereof will be readily apparent from consideration of the following specification relating to the annexed drawings, drawn to varying scales, in which:

Fig. 1 is a diagrammatic view of a towing vessel towing a pair of planing targets in accordance with the invention;

Fig. 7 is a plan view of a preferred embodiment of a shock absorber and emergency release mechanism by means of which a towline is attached to the target, the figure showing the mechanism in one position, and showing by broken lines a further, extreme position of some of the parts;

Fig. 8 is a sectional view taken on the line VIII—VIII of the mechanism shown in Fig. 7;

Fig. 9 is a front perspective view of the cable-carrier;

Fig. 10 is a back view of the cable-carrier;

Fig. 11 is a view showing a cable-carrier with towlines attaching means thereon in operative position; and Fig. 12 is a schematic view of a method of making a 180-degree turn with the preferred embodiment of the invention.

Figure 2:
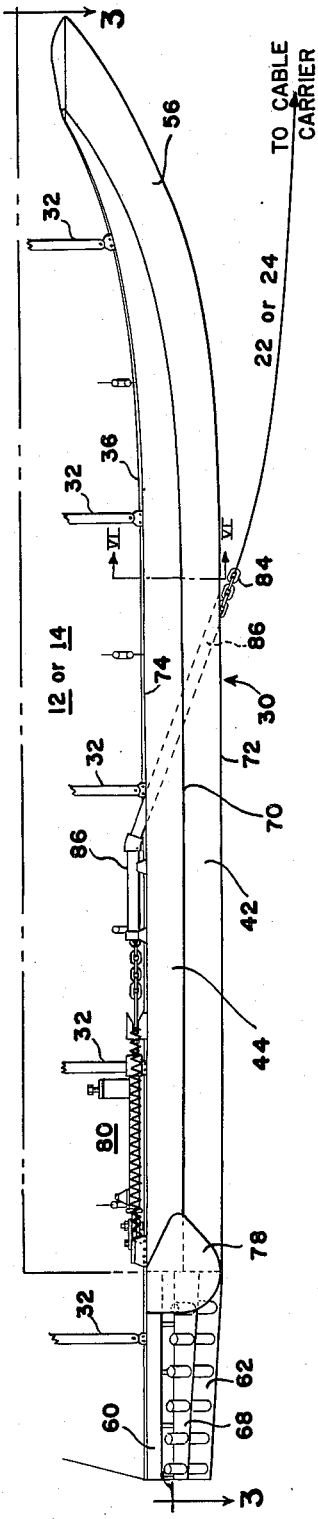
Fig. 2 is a side view of a preferred embodiment of the main elements of the towed target of the invention.

Referring now to the drawings, wherein like reference characters designate like or corresponding parts throughout several views, Fig. 1 illustrates a preferred embodiment of the invention as in use, and comprises a pair of towed targets 12 and 14 towed by a vessel 16 through a first cable portion or towline 18 extending from the vessel 16 to a cable-carrier or float 20, a second cable portion or towline 22 extending from the cable-carrier 20 to the towed target 14, and a third cable portion or towline 24 extending directly from the towed target 14 to the towed target 12.

The towline 18 is connected to the cable-carrier 20 through a bow painter 122 to a towpoint 26 of the cable-carrier; and the towline 22 is connected to the cable-carrier 20 through a stern painter 120 to a towpoint 28 of the cable-carrier. The towpoints 26 and 28 are along the vertical plane of the longitudinal centerline of the cable-carrier 20, and are secured thereto by any suitable means.

Figure 3:
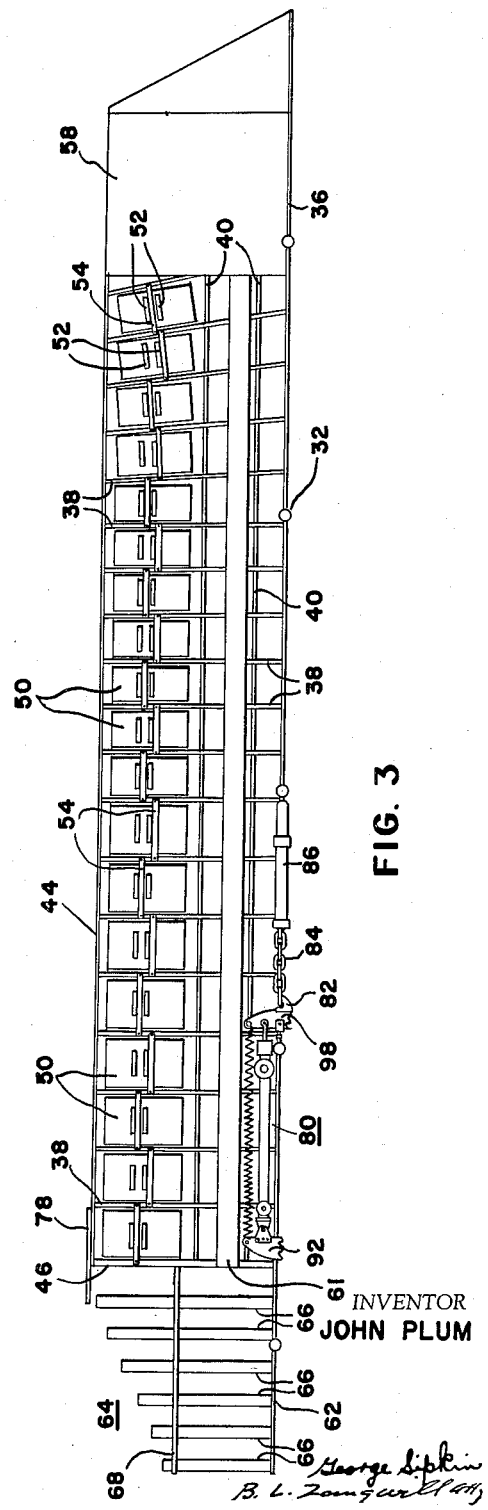
Fig. 3 is a plan view of a longitudinal half of the hull of the towed target shown in Fig. 2, with the stern extension removed.

Figs. 2 and 3 show for purposes of illustration the hull of a target drawn substantially to scale except for thin and small parts, the hull having a hull length of 56 feet, a beam of 14 feet, and a hull depth of 3 feet. The hull is indicated in its entirety by the reference numeral 30 and carriers masts 32, target screen 34 (see Fig. 1) and other customary equipment for a gun-practice target. Preferably, the hull 30 is constructed of wood and marine plywood with a centerline girder of steel; however, it will be apparent to those skilled in the art that any suitable construction material may be utilized.

Figure 5:
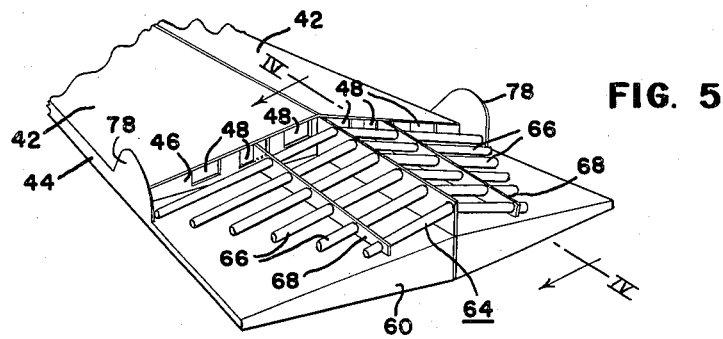
Fig. 5 is a perspective view of the rear section of the bottom of the towed target with its bottom upward.
Figure 4:
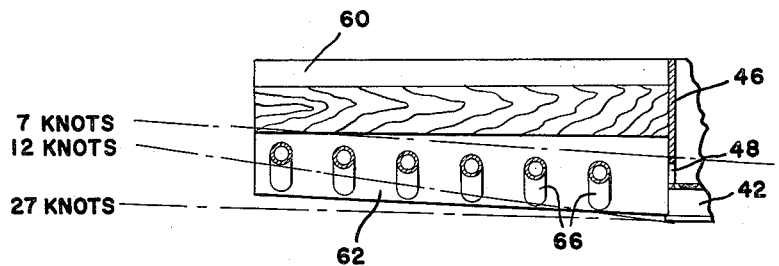
Fig. 4 is a view of the rear portion of the towed target, the view being a section substantially along the line IV—IV of Fig. 5, but Fig. 4 also illustrates the extent of the interaction of the sea anchor and the water at different speeds of the target.
Figure 6:
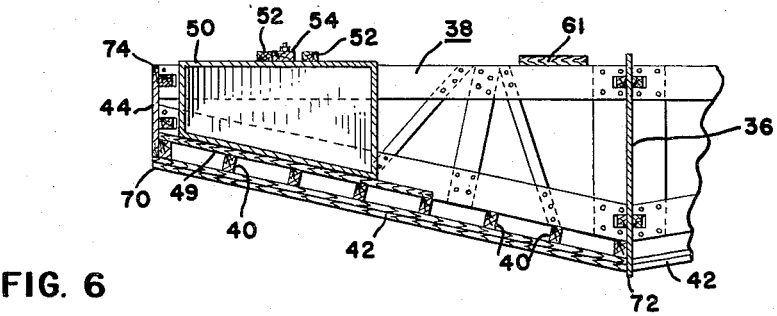
Fig. 6 is a transverse sectional view substantially along the line VI—VI of Fig. 2.

With reference also to Figs. 4, 5 and 6, the hull 30 comprises a centerline girder 36 that extends longitudinally for the length of the hull and supports the masts 32. The hull 30 comprises a plurality of transverse wooden frames 38 and longitudinal stringers 40 on both sides of the centerline girder 36 to maintain the hull's contour and to support the layered plywood skin comprising a V-shaped bottom 42 and sides 44. The hull 30 also comprises a wooden transom 46 perforated with open bailing holes 48 along its bottom portion, although the transom 46 can be substantially completely open across its full length from one side 44 to the other where greater bailing is to be provided. In such case the rear end of the hull is, in effect, completely open.

The hull 30 is substantially completely open at its top, and the frames 38 are spaced along the hull to provide a plurality of spaces on each side of the centerline girder 36, each space receiving a watertight box 50 of any suitable waterproof material, as for example, marine plywood, waterproofed cardboard, plastic, etc.

The watertight boxes 50 rest on battens 49 in the spaces, and each box has a pair of securing pieces 52 for securing the box to a cross-piece 54 extending between and secured to a pair of consecutive frames, as indicated more particularly in Fig. 3. Preferably a large number of boxes is provided in the hull, the specific embodiment shown comprising thirty-eight boxes, nineteen in each longitudinal side. The boxes 50 are clamped down between frame members 38 and close to the sides 44 of the hull for easy accessibility and replacement in case of rupture by gun-fire. The boxes 50 provide buoyancy and lateral stability to the hull 30 at very slow speeds.

The hull 30 is provided with a bow 56 to provide smooth contact between the hull and the water. The hull has a small bow deck area 58, and stern deck area 60 that extends rearward from the transom 46, and catwalks 61 for workmen or others to stand upon.

The stern deck is in the form of a rear or stern extension 60 and is preferably of solid wood and is secured to the transom 46 in any suitable manner. The stern extension 60 carries a mast 32 so that the extension, in effect, increases the length of the hull 30 so as to provide the necessary support for the required target screen size without increasing the drag at high speeds. The extension 30 also serves as a stern ballast to produce the correct static trim of the hull.

The centerline girder 36 extends beyond the transom 46 and helps to support the stern extension 60. In effect the extending part of the centerline girder 36 can be considered to be a centerline stern skeg 62.

The space under the stern extension 60 and to the rear of the transom 46 is occupied by a sea anchor indicated in its entirety by the references numeral 64 and having the form of a drag brake comprising low speed drag pipes 66 of different lengths, the centerline skeg 62, and a stiffening plate 68 parallel to and on each side of the centerline skeg 62. The drag pipes 66 are rigidly connected to the bottom of skeg 62 by welding or the like, in spaced relationship from the end of the skeg 62 toward the transom 46, and are inclined at an angle from the bottom of the skeg 62 toward the undersurface edge of the stern extension 60. The drag pipes 66 are also rigidly coupled together on both sides of the stern skeg 62 by the plates 68, and increase in length in a direction from the stern end of the skeg 62 toward the transom 46.

As indicated in Figs. 1–6, an extremely small profile view of the hull is presented as a target area. The chine 70 of the hull 30 is substantially midway between its keel 72 and its shear 74. The hull 30 is provided with side skegs 78 located on the side of the hull adjacent the hull's transom 46 for increasing the directional stability and maneuverability of the hull.

For towing each target, its hull 30 is provided with a shock absorber and emergency release mechanism 80 attached to the centerline girder 36. As shown better in Figs. 2, 3, 7, and 8, the mechanism 80 has an open hook 82 that is over the centreline girder 36. The hook 82 releasably receives a chain 84 that runs through a pipe 86 comprising a portion along the top of the centerline girder 36 and a sloping portion along the side of the girder, preferably the starboard side, but terminating about under the center of buoyancy of the target for aiding stability at low speeds. The slope of the sloping pipe-portion is preferably but not necessarily approximately the expected average towline angle at the towing speeds. If desired the sloping pipe portion can be made part of the centerline girder by splitting the girder at the desired angle and welding the pieces and the pipe properly together so that the pipe is at the center of the hull. The towline 22 or 24 is attached to the end of the chain 84 near the end of the pipe 86. The chain 84, as shown in Fig. 7, is connected to the open hook 82 by having one of its links pass over it.

The mechanism 80 is of the hydraulic type and comprises two parallel and coplanar hydraulic cylinders 90 pivotally attached to a bracket 92 stationarily fixed to the hull 30. Each cylinder 90 coacts with a double acting piston and rod 94 which passes through a stuffing box 96 and is pivotally connected to a floating bridle member 98.

Each cylinder 90 has a breather 99 at one end and a pressure control chamber 100 at the other end. The chambers 100 contain air under pressure that acts on the cylinder fluid, the air-pressure being under control of a common reduction valve 102.

The bridle member 98 is also coupled by a pair of springs 104 and a single trip cable 106 to the stationary bracket 92. The bridle member 98 is, therefore, capable of longitudinal movement. This movement is guided by guide and trip rails 108 capable of bearing on guide rollers 110. The extent of movement is determined by the initial level of brake fluid and the air pressure in the chambers 100. The limit of movement in one direction is determined by a chain stop 112 secured to the hull. A ball 114 in the chain 84 is incapable of passing raised portion 116 in the stop 112 which, in effect, is part of the pipe 86. The limit of movement in the other direction is determined by the length of the trip-cable 106. When the bridle member reaches this limit, further pull by the chain 84 causes the bridle member to pivot preferably about 10 angular degrees, as indicated by the broken line in Fig. 7, and pull the open hook 82 out of the end-link of chain 84, thereby releasing the chain.

It is to be noted that in towing condition the chain 84, which is preferably a strong steel chain, extends completely through the pipe 86 so as to provide a short portion below the target to which the associated towline, such as 22, can be fastened.

The towline 22 is also connected to the hollow float or cable-carrier 20 such as that shown in Figs. 9, 10 and 11 which are drawn substantially to scale, but not the same scale, for a cable-carrier symmetrical about its horizontal plane having a length of fifteen feet and a constant beam of six feet. The towline 22 is connected to a stern painter 120 which is secured to the cable-carrier's stern towpoint 28. The cable-carrier 20 also receives the towline 18 through a bow painter 122 which is connected to the keel towpoint 26 of the cable-carrier. The towlines 18 and 20 are directly coupled by a slack retrieving wire 124.

In connecting the towlines, they are connected to the chains 84 in any suitable manner, the towline 24 being connected to the stern of the target 14 in any suitable way. After towline 22 has been attached to the hull 30, the full length of towline is paid out until the retrieving connection wire 124 appears. Thereafter, the cable-carrier's stern painter 120 is attached to one end of the retrieving wire 124, and the bow painter 122 to the other end. At this point the cable-carrier is bottom-up so that the full length of the bow painter is in view and entanglement of the cables can be prevented before they occur. Thereafter, towline 18, also secured to the bow painter, is eased out and the cable-carrier rights itself.

As an indication of the cables used with equipment of sizes specifically mentioned before, it is noted that a towline, such as 22, had a length of approximately 3,500 feet and a 9/16 inch diameter; the stern painter, such as 120, had a length of approximately 55 feet and a 9/16 inch diameter; the retrieving wire had a length of approximately 108 feet and a 9/16 inch diameter; the bow painter, such as 122, had a length of approximately 40 feet, and a ¾ inch diameter; and the towline, such as 18, had a length of approximately 3,500 and ¾ inch diameter.

This, it is to be observed that the cable portion 18 is thicker than the cable portion 22 which in turn can be thicker than the cable portion 24. Additionally, the cable-carrier 20 supports the cable portions substantially midway between the towing vessel 16 and the first target 14. The depth of sag in the cables 18 and 22 is much less than that which would occur if a single length of cable without an intermediate support extended between the vessel and target. Consequently, the vertical component of tension due to sag is less when a cable-carrier is used than when it is omitted. This means that a smaller in diameter hawser or towline can be used. For example, in the illustration set forth above the largest diameter was three-fourth inch, a material decrease from the one and three-eighth inches diameter set forth at the very beginning of the specification.

In operation, the hydraulic shock absorbing mechanism 80 on the hull 30 of a target prevents shock loads on the towlines 18 and 22, and also releases towline 22 (and its chain 84) when the target is beyond ability to plane and before the target drag increases above the yield strength of the towline. The initial tension in the mechanism 80 is obtained from bottled air-pressure admitted into chambers 100 and set at approximately a thousand pounds higher than the target drag at the design maximum speed, so that the bridle member 98 will extend for shock loads only, and not be worn out by constant flexing from small changes in towline tension. The release tension in the mechanism 80, which is determined by the height of the brake fluid inside chambers 100, is set at approximately a thousand pounds lower than the yield strength of the towline 22. Both the initial tension and the release tension can be adjusted to accommodate different towing conditions; accordingly, the mechanism 57 will save very valuable cable material and insure the continuation of target practice. For instance, when identical targets are towed in tandem and the one aft (which should be used first) is damaged so that it can no longer plane, the trip cable 106 and bridle member 98 will reach the limit of their longitudinal travel; the bridle member will pivot and cause the open hook 82 to pull out of the end-link of chain 84. This means that the emergency release will release the damaged target before the towlines are over-strained, and gunnery practice can continue with the remaining target.

During towing, stability is improved by the drag brake 64. Fig. 4 illustrates the water flow past the low speed drag pipes 66 at different speeds. At 7 knots the water flow is over all the drag pipes introducing considerable drag; at 12 knots the flow commences to avoid some of the pipes so that the drag brake 64 adds less drag; and at the high speed of 27 knots, the flow completely avoids the drag pipes 43 and the hull is in full planing attitude without the drag of the drag brake.

During variations in speed, the target hull is self-bailing. At low speeds sea water can enter the open hull 30 but buoyancy is maintained by the watertight boxes 50. At the higher speeds planing takes place and sea water that is already inside the hull or splashes into or otherwise gets into the hull, drains out through the holes 48 in the transom 46.

Fig. 12 illustrates a method of making a complete turn-about or 180-degree turn with the specific embodiment of the invention herein described.

During a turn the target will take a shorter path than that of the towing vessel; and accordingly the average speed of the target during the turn will be less than the speed of the towing vessel. Consequently, decelerations and accelerations which will strain the towlines 18 and 22 cannot be avoided if the towing vessel maintains a constant speed and a constant turning radius during the turn. A uniform speed of the target can be produced if the towing vessel enters the turn with a speed well below its maximum, so that at the time the target would start decelerating the towing vessel can counteract this by either accelerating or increasing the turning radius, or by doing both. A simple turning procedure following this method is shown in Fig. 12 which for purpose of illustration is drawn substantially to a scale of 3.20 inches per mile, and indicates the paths of travel and the positions of an assembly of a towing vessel towing a single target with the aid of a single cable-carrier. In Fig. 12 the bottom line X, Y, Z, indicates the position of the assembly at the beginning of the turn, the towing vessel being at point X, the cable-carrier at piont Y, and the towed target at point Z, all moving at the instant in the direction from Z to X. In making the turn, the towing vessel follows the curve 130, the cable-carrier follows the curve 132, and the target follows the curve 134. The circles on the curves represent ten-second time intervals, and the pairs of broken lines 140, 142, 144, 146 and 148 join the circles of the curves which are representative of 100, 200, 300, 400, and 500 second intervals after the beginning of the turn.

Assuming that at the beginning of the turn the assembly is traveling at 27 knots, the towing vessel slows down to 20 knots before entering the turn; at point X the towing vessel turns 60 degrees with full rudder and at the same time accelerates to 27 knots. After turning 60 degrees, which takes about 40 seconds, the rudder is eased up and the turn continued with the cable-carrier about 45 degrees abaft the beam. During the turn the angle between the lines joining the towing vessel, the cable-carrier and the target gradually decreases, as indicated by the pairs of lines 140, 142, 144, 146, and 148. The angle between the pair of lines 140 is greater than that between the pair of lines 142; that between the pair of lines 142 is greater than that between the pair of lines 144; etc. A complete 180-degree turn to starboard can be made within ten minutes and a nearly uniform target speed maintained during the turn.

However, in connection with turns, the Magnus-effect produced by the lay of the strands in the cable and the transverse motion of the cable through the water will cause the cable to rise towards the surface during a starboard turn, and sink deeper when turning to port. Consequently, in turns to port the maximum cable tension might increase beyond the yield strength of the cable if the speed is not kept down during turns. Accordingly, in the turning procedure illustrated in Fig. 12, a U-turn to port would require the speed of the towing vessel to be maintained at 20 knots during the entire turn, and not to be accelerated to 27 knots before it has assumed the new course ahead of the target.

As a comparison with the prior art, a preferred embodiment of the invention, as specifically described above, weighs approximately 21,000 pounds and carries the same area of target screens as previous targets weighing approximately 150,000 pounds; also, the same maximum speed is attained with towlines weighing 5,320 pounds as opposed to towlines weighing 13,560 pounds needed for previous targets of solid wood at the same speed. The preferred embodiment has an exceptionally high drag at low speeds with consequent reduced sag of towline and improved maneuverability at these speeds; also, it carries the target screens without loss of stability even after its bottom has been ruptured repeatedly by gunfire. Moreover, two targets towed in tandem at the design maximum speed will not overload the towlines. The towed target's open hull and self-bailing feature and the spring loaded towpoint with an automatic emergency release reduce cable breaking; and in the case of tandem towing, prevent the interruption of target practice.

Various modifications are contemplated and may obviously be resorted to by those skilled in the art without departing from the spirit and scope of the invention, as

What is claimed is:

1. In a high speed towed craft, a planing hull and a drag brake secured to the rear of said hull, said drag brake comprising a plurality of rods spaced longitudinally with respect to the centerline of said hull and extending transversely.

2. A planing hull having a draft that decreases as the speed of the hull increases, said hull comprising a stern transom and a stern extension above the water line of said planing hull, a centerline girder extending from the bow to the stern of said planing hull, a centerline stern skeg extending past said transom of said planing hull, stern drag means comprising a plurality of laterally unequal length pipes beneath said stern extension and secured to said centerline stern skeg, said pipes being longitudinally spaced from each other in progressively increasing lateral lengths from the end of said centerline to the transom of said planing hull.

3. A hollow planing hull having a V-bottom and substantially parallel sides, said sides being interconnected by a triangularly-shaped bow and a stern transom, a centerline girder extending from said triangularly shaped bow to said stern transom, a centerline stren skeg extending for a set distance past said stern transom, a stern extension secured to the upper part of said stern transom and to said centerline stern skeg, whereby stern ballast is provided for correct static trim of said hollow planing hull, a drag brake comprising a plurality of laterally extending low speed drag pipes attached to the lower portion of said centerline stern skeg and extending upward at an angle toward the underside of said stern extension, plates on either side of said centerline stern skeg, and said drag pipes being secured to said plates.

4. The invention as defined in claim 3 but further characterized by said stern transom being open.

5. The invention as defined in claim 3 but further characterized in that said hollow planing hull has a plurality of watertight boxes removably fixed adjacent said parallel sides whereby the buoyancy of said hollow planing hull is increased at low speeds.

6. The invention as defined in claim 3 but further characterized by said centerline girder having target screen carrying means and towline coupling means attached thereto, said towline coupling means comprising a guide pipe extending from said V-bottom to the top of said centerline girder, a towline connecting chain running through said guide pipe to the top of said centerline girder, a chain stop limiting the movement of said towline connecting chain within said guide pipe to a set amount, said towline connecting chain being connected to an open hook and said open hook secured to a longitudinally movable bridle member, said longitudinally movable bridle member elastically secured to a longitudinally spaced stationary bracket by a pair of springs and by a hydraulic shock absorbing mechanism, said hydraulic shock absorbing mechanism comprising a pair of laterally spaced hydraulic cylinders pivotally mounted to said stationary bracket, each of said hydraulic cylinders having a piston pivotally mounted to said longitudinally movable bridle member, one of said pair of springs enclosing a trip-cable having a predetermined length and having one end attached to said stationary bracket and the other end attached to said longitudinally movable bridle member.

7. The invention as defined in claim 6 but further characterized in that said longitudinally movable bridle member has a pair of spaced guide pegs, said longitudinally movable bridle member being movable on a pair of trip-rails whereby said open hook will release said towline connecting chain when said trip-cable extends to its predetermined length and said guide pegs engage said trip-rails to pivot said longitudinally movable bridle member.

8. The invention as defined in claim 6 but further characterized in that said guide pipe has an opening for said towline connecting chain on said V-bottom forward of the center of the hollow planing hull.

9. A target for gunnery practice towed by a towing vessel, comprising a hollow planing hull having a bottom, sides and a centerline girder, target screen carrying means secured to said girder, drag braking means at the stern of said hull, a spring-loaded towpoint secured to said hollow planing hull, a first towline connected to said spring-loaded towpoint, a hollow planing cable-carrier having a stern painter and a bow painter secured thereto, said first towline interconnecting said hollow planing hull and said stern painter, a second towline being larger than said first towline and interconnecting the towing vessel and said bow painter, whereby the target is connected to the towing vessel for towing without large towline sag at high and low speeds.

10. In a towed vessel, a spring loaded towpoint for coupling a towing cable to the towed vessel comprising: a stationary bracket, a movable bridle member having an open hook thereon, said movable bridle member being slidingly mounted, a plurality of laterally spaced hydraulic cylinders pivotally mounted to said stationary bracket, each of said hydraulic cylinders having a piston pivotally mounted to said movable bridle member, a plurality of springs attached to said stationary bracket and to said movable bridle member, a trip-cable having a set length and having one end attached to said stationary bracket and the other end attached to said movable bridle member, whereby said movable bridle member is elastically secured to said stationary bracket for limited movement, a towline connecting chain interconnecting said open hook and the towing cable, and means for causing said bridle member to pivot when it moves a predetermined distance from said stationary bracket, whereby said open hook will release said towline connecting chain when said trip-cable extends to said set length.

11. A towed target for gunnery practice comprising a hollow planing hull having a bottom, sides and a centerline girder, target screen carrying means secured to said girder, a plurality of spaced transverse frames between said sides, a plurality of watertight boxes in the spaces between said frames on one side of said girder, and a second plurality of watertight boxes in the spaces between said frames on the other side of said girder, a substantially open transom providing self-bailing of the hull with respect to any water entering therein so that the water can drain out under said frames, an extension of the hull aft of said transom above the waterline and having means for creating drag.

12. A towed target as defined in claim 11 said means for creating drag further characterized by comprising a plurality of pipes spaced longitudinally with respect to the centerline of the hull and extending transversely.

13. A tow target for naval use comprising a hull comprising a centerline girder, a rear extension rearwardly of said centerline girder, and drag means comprising a plurality of longitudinally spaced rods extending sideways, said rods being secured to said rear extension.

14. A tow target as defined in claim 13 but further characterized by said hull having a planing bottom having bottom sides sloping transversely upwardly from said centerline girder, said rods being generally in a plane above those of said bottom sides in still position of the target.

15. A tow target comprising a hull having a bow and stern, a centerline girder, said hull having a bottom with bottom-sides sloping transversely upwardly from the centerline girder, and means for securing a tow line to said target, the last said means providing a single tow point at the bottom of said centerline girder.

16. A tow target comprising a hull having a bow and stern, a centerline girder, said hull having a bottom with bottom-sides sloping transversely upwardly from the centerline girder, and means for securing a tow line to said target, the last said means providing a single tow point at the bottom of said centerline girder, said tow line securing means comprising a securing point for the tow line at an upper part of said centerline girder.

17. A tow target as defined in claim 16 but further characterized by a tubular guide means for the tow line extending from said securing point to said tow point.

18. A tow target as defined in claim 16, but further characterized by said securing point being in the aft part of the target.

19. A tow target as defined in claim 18 but further characterized by said tow point being substantially under the center of buoyancy of the target.

20. A tow target as defined in claim 15 but further characterized by said tow point being substantially under the center of buoyancy of the target.

References Cited in the file of this patent

UNITED STATES PATENTS

| | | |
|---|---|---|
| 1,335,278 | Donnelly | Mar. 30, 1920 |
| 2,353,020 | Dyer | July 4, 1944 |
| 2,488,183 | Garmont | Nov. 15, 1949 |
| 2,513,153 | D'Intino | June 27, 1950 |

FOREIGN PATENTS

| | | |
|---|---|---|
| 19,091 | Great Britain | 1912 |
| 25,916 | France | Mar. 6, 1923 |
| | (Addition to No. 495,129) | |
| 347,212 | Italy | Apr. 1, 1937 |
| 838,860 | France | Dec. 16, 1938 |